United States Patent [19]
Sato

[11] Patent Number: 4,505,372
[45] Date of Patent: Mar. 19, 1985

[54] DEVICE FOR SUPPLYING PIECE TO BIAXIAL ORIENTATION BLOW MOLDING MACHINE

[75] Inventor: Nobuo Sato, Funabashi, Japan

[73] Assignee: Yoshino Kogyosho Co., Ltd., Tokyo, Japan

[21] Appl. No.: 32,742

[22] Filed: Apr. 24, 1979

[30] Foreign Application Priority Data

Apr. 24, 1978 [JP] Japan .................................. 53-48572

[51] Int. Cl.³ ............................................. B65G 47/24
[52] U.S. Cl. .................................... 198/404; 198/408; 198/689; 425/534
[58] Field of Search ............... 198/403, 404, 408, 457, 198/689, 389; 425/526, 534

[56] References Cited

U.S. PATENT DOCUMENTS

| | | | |
|---|---|---|---|
| 2,923,397 | 2/1960 | Parrish | 198/404 |
| 3,127,210 | 3/1964 | Schreiber | 198/403 |
| 3,372,790 | 3/1968 | Pembroke et al. | 198/389 |
| 3,426,884 | 2/1969 | Donner | 198/408 |
| 3,490,575 | 1/1970 | Hermann | 198/404 |
| 3,721,340 | 3/1973 | Kruse et al. | 198/689 |
| 4,076,113 | 2/1978 | Shields | 198/403 |
| 4,223,778 | 9/1980 | Kontz | 198/389 |
| 4,271,587 | 6/1981 | Shields | 198/480 |
| 4,293,063 | 10/1981 | Shields | 198/404 |
| 4,312,437 | 1/1982 | Suzuki et al. | 198/404 |

Primary Examiner—Joseph E. Valenza
Attorney, Agent, or Firm—Parkhurst & Oliff

[57] ABSTRACT

A device for supplying a cylindrical bottomed preform from an injection molding machine to a biaxial orientation blow molding machine, in which the pieces are conveyed in an upward opening attitude. The pieces are then inverted by an inverting table for inverting the piece from the upward opening to a downward opening attitude. The pieces are horizontally moved into piece guide recesses by an inserting plate and are dropped from the recesses to mandrels of the heat blow molding machine directly under the piece thus conveyed by a stopper plate to assemble the piece thus dropped with the mandrel for the biaxial orientation blow molding process.

14 Claims, 6 Drawing Figures

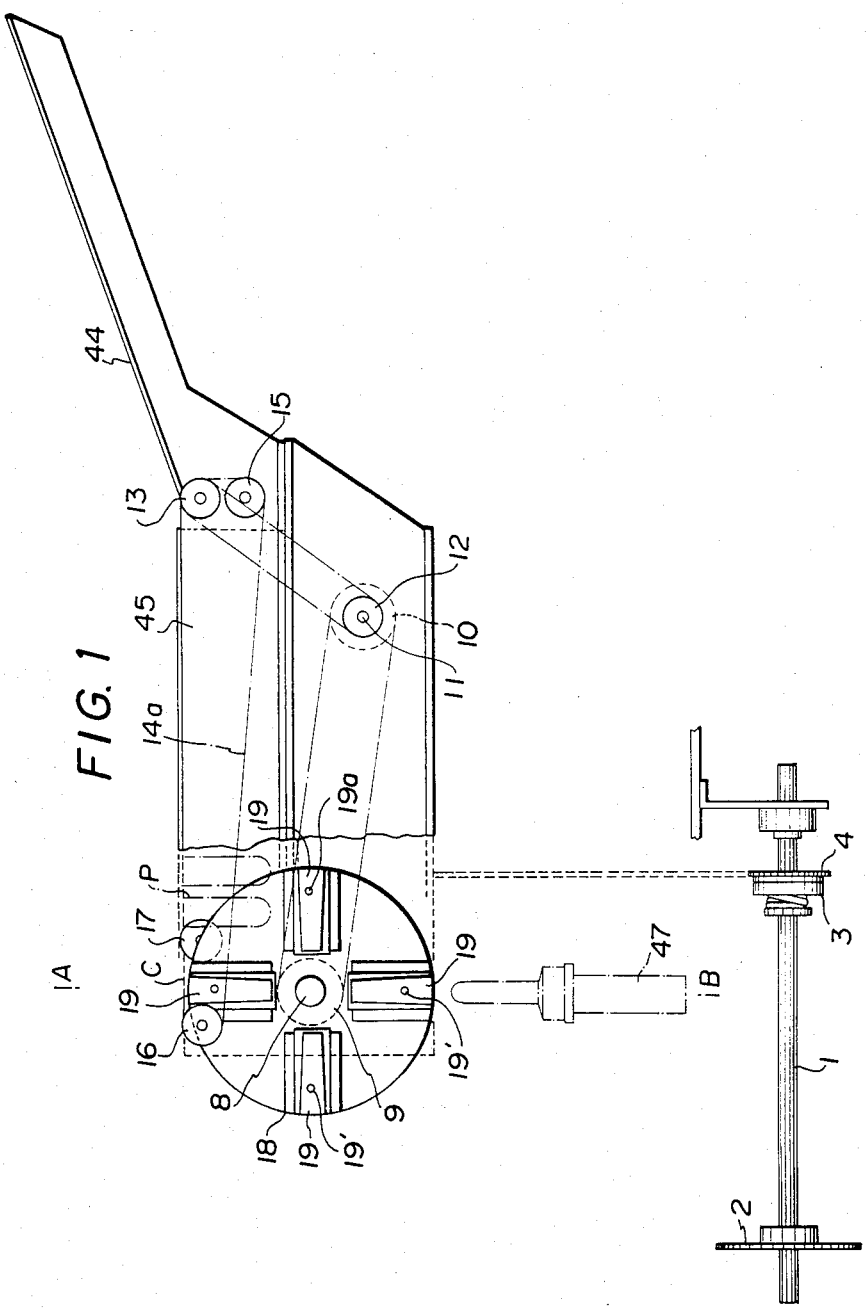

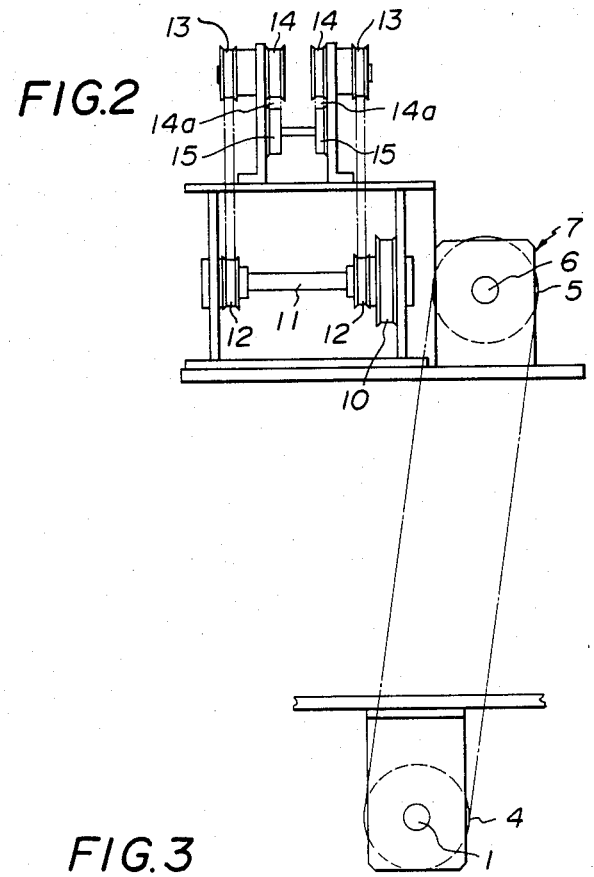
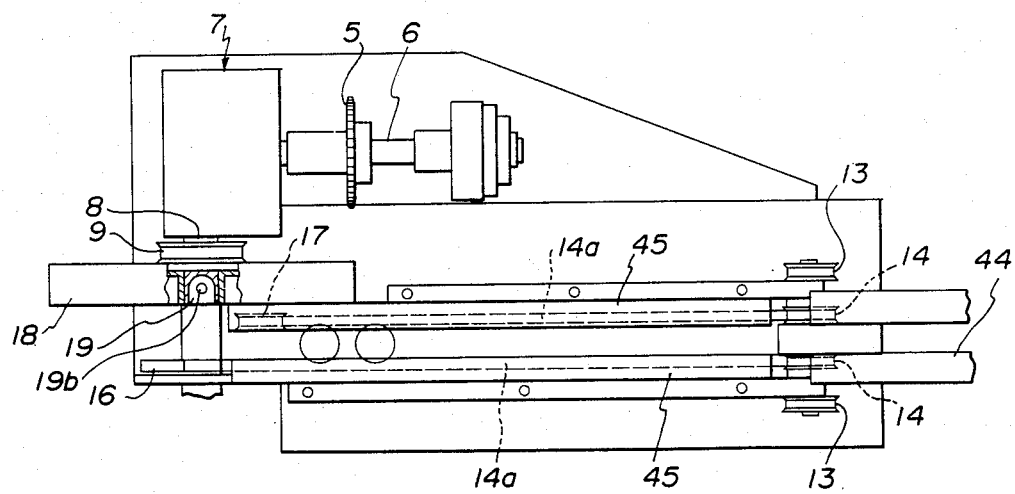

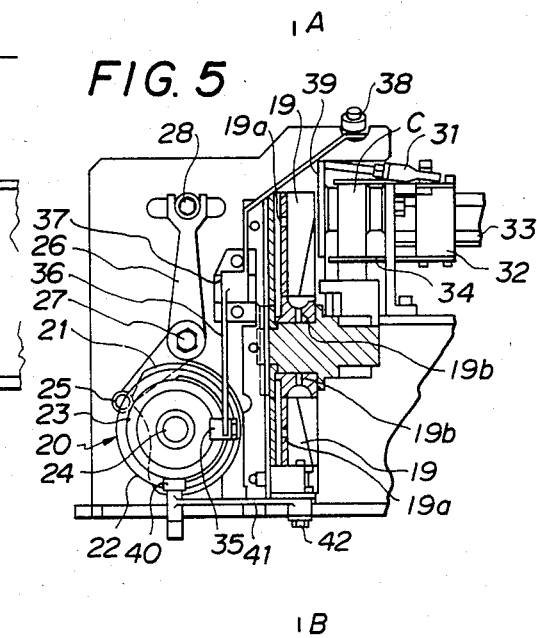
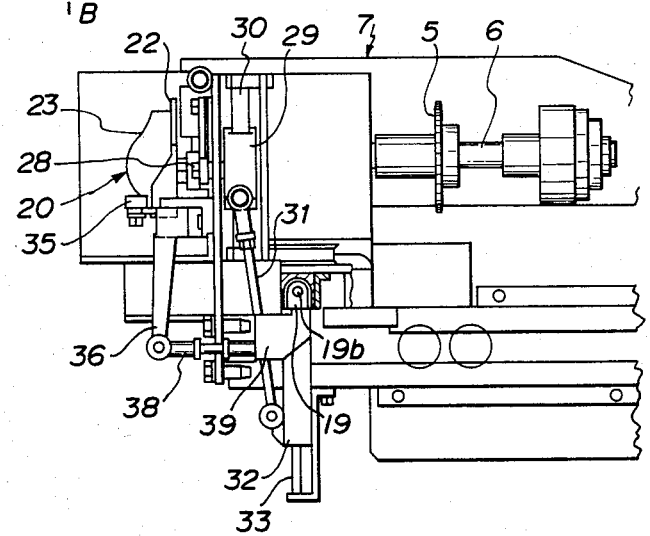

DEVICE FOR SUPPLYING PIECE TO BIAXIAL ORIENTATION BLOW MOLDING MACHINE

BACKGROUND OF THE INVENTION

The present invention relates to a biaxial orientation blow molding machine and, more particularly, to a device for supplying a piece of cylindrical shape with a bottom and an open top or neck end, preformed by an injection molding machine, to a biaxial orientation blow molding machine.

In molding a bottle-shaped container of polyethylene terepthalate resin by means of an injection blow molding process, there is adopted an injection blow molding process which has the steps of first molding a cylindrical piece with a bottom by an injection molding machine, and then biaxial orientation blow molding the piece. Generally the injection-molded piece is cooled to a predetermined temperature by the difference of molding temperatures between the injection molding time and the blow molding time while the injection-molded piece is being supplied to the blow molding machine. The piece thus cooled is reheated to a predetermined temperature before the blow molding process.

The most advanced blow molding machine at present used consists of a heater and a blow molding machine assembled integrally. In operation, the piece is assembled with a mandrel which is detached from a turntable, the mandrel with the piece is assembled with the turntable, and the piece is intermittently moved integral with the turntable in order to heat the piece to a predetermined temperature and execute the blow molding step.

It is required in such a blow molding machine to construct it so that it will rapidly and accurately assemble the piece to the mandrel detached from the turntable and assemble the piece with the mandrel from above due to the operational standpoint of the mandrel itself. In other words, it is required to supply the piece to the mandrel in an inverted attitude such that the opening of the piece is directed downwardly.

In the meantime, since the pieces are normally relatively small in size, a number of the pieces are simultaneously molded and are conveyed by a belt conveyor or the like without control of their attitude. If the attitude of the pieces is required to align and convey with their openings facing upwardly or downwardly, the pieces can be naturally stood normally by their own weight by engaging the necks of the pieces at a projected ledge peripherally provided therearound in case of the upward opening attitude, but it is impossible to convey the pieces in inverted attitude automatically because the shape and weight of the piece cannot be utilized automatically to invert the attitude of the pieces to a downward opening attitude.

Since the pieces can merely be conveyed at random in lateral attitude or in upward opening attitude though they must be assembled with the mandrel in downward opening attitude, they are assembled with the mandrel by manually inserting the pieces thus conveyed. Accordingly, the step of assembling the pieces with the mandrel is much lower in treating capacity than the other steps, thereby lowering the speed of the biaxial orientation blow molding process of a bottle-shaped container.

SUMMARY OF THE INVENTION

The present invention provides a device for supplying a cylindrical preform with a bottom to a biaxial orientation blow molding machine, in which the pieces are conveyed as interposed between two conveyor belts in upward opening attitude, are then inverted by an inverting table advantageously constructed to rotate intermittently at every 90°, are horizontally moved into a piece guide recess by an inserting plate, and are further dropped from the recess to a mandrel directly under the piece by a stopper plate thereby to supply the piece in downward opening attitude to a biaxial orientation blow molding machine.

Accordingly, an object of the present invention is to provide a device for supplying an injection-molded, bottomed cylindrical preform to a biaxial orientation blow molding machine by inverting the piece 180° to a downward opening attitude and engaging it with the mandrel of the blow molding machine. This device can accelerate the molding speed of a biaxial orientation blow molding process by eliminating the disadvantages of the conventional blow molding process.

Another object of the present invention is to provide a device for supplying an injection-molded, bottomed cylindrical preform to a biaxial orientation blow molding machine which can automatically invert the normally standing piece to a downward opening attitude and can assemble it automatically with a mandrel at a preferable timing adapted for the molding cycle at a heat blow molding machine.

Still another object of the present invention is to provide a device for supplying an injection-molded, bottomed cylindrical preform to a biaxial orientation blow molding machine which can automate the supply of the preforms to a heat blow molding machine without man power a speed adapted for the molding cycle of the heat blow molding machine.

BRIEF DESCRIPTION OF THE DRAWINGS

These and other objects and features of the present invention will become more apparent from the following description of the preferred embodiments of the present invention in conjunction with the accompanying drawings, in which:

FIG. 1 is a front schematic view of a preferred embodiment of the device for supplying a piece to a biaxial orientation blow molding machine including the disposition of a drive power transmission and an intermittent piece conveyor with a portion for inverting the piece from upward opening attitude to downward opening attitude according to the present invention;

FIG. 2 is a partial essential side view showing the disposition between the piece conveying portion, a piece inverting table and an index unit;

FIG. 3 is a partial plan view essentially showing the conveyor belt driving mechanism used for the device according to the present invention;

FIG. 4 is a partially fragmentary front view essentially showing the portion for supplying the piece to the inverting table and controlling its dropping;

FIG. 5 is a side view of the portion shown in FIG. 4; and

FIG. 6 is a plan view of the portion shown in FIG. 4.

DETAILED DESCRIPTION OF THE PREFERRED EMBODIMENTS

Referring now to the drawings, FIGS. 1 to 3 show one embodiment of a device for supplying a bottomed cylindrical preform to a biaxial orientation blow molding machine according to the present invention, wherein like reference numerals designate the same parts in the following views. The device for supplying a piece P of upward opening attitude continuously to a heat blow molding machine consists of a piece conveying unit for intermittently conveying pieces P of upwardly opening attitude continuously to a heat blow molding machine, a piece inverting unit for inverting the pieces P thus intermittently conveyed by the piece conveying unit to downward opening attitude and dropping the inverted piece P to a mandrel 47 disposed directly under the pieces P to assemble the piece P with the mandrel 47, a piece guide recess inserting cam unit for controlling the supply and drop of the piece P to the piece inverting unit at predetermined timing to a piece guide recess, and a piece guide recess piece dropping unit for dropping the piece P from the piece guide recess at predetermined timing synchronous with the operation of the heat blowing molding machine.

Each of the respective units in the device for supplying the piece P to the hot blow molding machine according to the present invention will be described in detail.

Piece Conveying Unit

FIGS. 1 through 3 show the detailed configuration of a preferred embodiment of the piece conveying unit according to the present invention. This piece conveying unit intermittently conveys the pieces P of upwardly opening attitude continuously supplied from a supply chute 44 to a heat blow molding machine synchronously with the supply speed of the mandrel or jig 47.

The supply chute 44 has two flat surface guide rails inclined in parallel at an interval of the extent slightly larger than the outer diameter of the body of the piece P for lowering the pieces P supplied to the parallel guide rails along the slope of the guide rails whereby the piece P joins an upward opening attitude by the self-weight upon engagement of a projected ledge, provided peripherally at the neck thereof, with the guide rails.

There are provided two conveyor belts 14a, 14a for conveying the pieces P supplied downwardly from the supply chute 4 by interposing the piece P via the neck of the piece P between belt pulleys 14, 16 and 14, 17 rotatably mounted at side plates 45, 45 disposed in parallel.

The conveyor belts 14a, 14a are laid in parallel at an interval of the extent corresponding to the outer diameter of the body of the piece P in the same manner as the guide rails of the supply chute 44 move atr the same speed with each other, thereby conveying the pieces P in interposing state.

The belt pulleys 16 and 17 are disposed at least by the distance corresponding to the thickness of the piece P toward the conveying direction of the piece P at their mounting positions thereof to form the conveying end of the piece P by the conveyor belts 14a, 14a in order to form a conveying-out position C of a supply port of the piece P inverted to downward opening attitude to the portion for dropping the piece P to the mandrel 47. More particularly, as obviously from FIG. 1, the belt pulley 17 engaged between the one conveyor belt 14a and the belt pulley 14 is disposed at this side along the conveying direction of the piece P with respect to the belt pulley 16 engaged between the conveyor belt 14a of this side and the belt pulley 14. Accordingly, the pieces P are conveyed via both the conveyor belts 14a, 14a to the belt pulley 17. The conveying-out position C of the pieces P thus conveyed becomes the side plate 45 side mounted with the belt pulley 17 perpendicular to the conveying direction between the belt pulleys 16 and 17.

In the exemplified embodiment shown, although the conveyor belts 14a, 14a are also engaged with a belt pulley 15 in addition to the belt pulleys 14, 16, 17 the belt pulley 15 controls the impart predetermined tension to the conveyor belts 14a, 14a.

The belt pulley 14 is fixedly secured to the same shaft as a transmission pulley 13 to rotate integrally with the pulley 13.

A belt is engaged between the transmission pulley 13 and a timing pulley 12 secured to a repeating shaft 11, which is secured to a timing pulley 10 for transmitting the rotation of a timing pulley 9 secured to the output shaft 8 of an index unit 7. The outer diameters of the respective pulleys are so determined that the conveyor belts 14a, 14a are moved at a distance corresponding to the piece P by one rotation of the output shaft intermittently rotating at its central angle of 90°. More specifically, when the output shaft 8 intermittently rotates at its central angle of 90°, the belt pulleys 14a, 14 rotate in the amount corresponding to the distance of one piece P driven by the conveyor belts 14a, 14a.

Piece Inverting Unit

FIGS. 1, 3, and 4 show a preferred embodiment of the piece inverting unit of the device for supplying the piece P to the heat blow molding machine according to the present invention.

The piece inverting unit essentially has an inverting table 18 secured to the output shaft of the index unit 7 in vertical attitude and so disposed as to face the piece P located at the position C with the upper half center of the end surface thereof.

The inverting table 18 is a circular disk having a larger radius than the length of the piece P at least, and has piece guide recesses 19 capable of containing and holding the piece P at the end surface faced with the position C when the intermittently rotating output shaft 8 is stopped. Thus, four piece guide recesses 19 are formed on the table 18 at every 90° of the central angle of the table 18.

Each of the piece guide recesses 19 is formed in an open groove state opened on the peripheral surface of the inverting table 18 for containing and holding the piece P located at the position C when the piece P is horizontally urged at right angles with respect to the conveying direction of the conveyor belts 14a, 14a while maintaining the piece P in an upward opening state.

In the meantime, it is necessary that the piece guide recesses 19 hold the pieces P without dropping them during the time while each of the piece guide recesses 19 reaches piece dropping position B inverted at 180° by the intermittent rotations of 90° of the inverting table 18 after it is disposed at a piece inserting position A faced with the position C for containing and holding the piece P. Various means can be considered for holding the piece P within the piece guide recess 19.

The most simple and practical means has a frame 46 capable of covering the peripheral and end surfaces of the inverting table 18 at least from the piece inserting position A to the piece dropping position B.

It is preferable that the frame 46 is disposed and secured at and to the peripheral and end surfaces of the inverting table 18 almost without gap at the inside thereof with sufficient smoothness of the inside surfaces so as not to scratch the piece P.

Another means for holding the piece P within the piece guide recess 19 has one or more suction holes 19a perforated at the wall of the piece guide recess 19 at the position facing the body of the contained piece P for evacuating the air, for example, through one or more holes perforated at the output shaft 8 thereby to hold the piece P within the piece guide recess 19 without dropping by utilizing the vacuum effect on the piece P by intaking air through the holes 19a. It is advantageous in this means to operate the evacuation of the air by the frame 46 because it is difficult to synchronize the timing of stopping the evacuating operation of the piece P located at the position B.

The piece P which has arrived at the dropping position B from the piece guide recess 19 is dropped naturally by the self-weight of the piece P. However, it may be provided within the spirits of the present invention that, in order precisely to drop the piece P from the piece guide recess 19, one or more exhaust holes 19b are perforated at the bottom of the piece guide recess 19 for vigorously discharging air therefrom toward the piece guide recess 19 at the position B at a predetermined timing to aid the drop of the piece P from the piece recess 19.

Piece Guide Recess Inserting Cam Unit For Inserting Piece P Into Piece Guide Recess 19 And Piece Guide Recess Piece Dropping Unit For Dropping Piece P From Recess 19 At Predetermined Timing FIGS. 4 through 6 illustrate the detailed configurations of preferred embodiments of the piece guide recess inserting cam unit and the piece guide recess piece dropping unit according to the present invention.

There are provided a piece inserting plate 34 disposed at the position C for inserting the piece P slidably moved horizontally at right angle from the conveying direction of the conveyor belts 14a, 14a into the piece guide recess 19 located at the inserting position A, a stopper slide plate 39 disposed at the position C for prohibiting movement of the pieces P in a free state toward the inverting table 18 side and slidably moving out of the inserting position A when the piece P is inserted into the piece guide recess 19, and a stopper plate 43 disposed at the dropping position B for holding the piece P not to drop the piece P immediately from the piece guide recess 19 even when the piece guide recess 19 is disposed at the dropping position B, dropping the piece P at a predetermined timing.

The plates 34, 39, 43 thus constructed are operated synchronously at predetermined timing by a cam 20 secured to a camshaft 24 continuously rotating at predetermined speed.

An inserting cam 21 is provided to operate the inserting plate 34, and is exemplified to be flat with a cam surface at the peripheral surface thereof.

An inserting cam roller 25 is always urged to the inserting cam 21 to be rotatably secured to the end of a rockable arm 26 rockably secured via a rocking pin 27 at one end and connected via a connecting pin 28 to a slide 29 at the other thereof.

The slide 29 is slidably assembled with slide rails 30 laid in parallel horizontally at right angle with the conveying direction of the piece P by the conveyor belts 14a, 14a, and a slide 32 is connected via a connecting arm 31 to the slide 29.

The slide 32 is slidably assembled with slide rails 33 disposed in parallel with the slide rails 30, and the piece inserting plate 34 is secured to the slide 32.

An insertion stopper cam 32 for operating the stopper slide plate 39 is constructed to have a cam surface at the end of its cylindrical body. A stopper cam roller 35 is always urged to the insertion stopper cam 23 to be rotatably assembled with the end of the rockable arm 36 rockably secured via a rocking pin 37.

The stopper slide plate 39 is secured via a connecting arm to the other arm of the rockable arm 36.

A dropping cam 22 is constructed to have a cam surface at the end of its cylindrical body in the same manner as the insertion stopper cam 23. A dropping cam roller 40 is rotatably and always urged onto the end of a rockable arm 41 rockably secured via a rocking pin 42 at one end and secured with a stopper plate 43 at the other thereof.

As obvious by the cam 20 in FIGS. 5 and 6, the mutual timing of the piece inserting plate 34, stopper slide plate 39, and stopper plate 43 is so provided that, while the inserting plate 34 is advanced from the retarded position and is again returned to the retarded limit position, the stopper slide plate 39 is moved from the piece inserting position A out of the position to release the insertion stopping operation of the piece P. However, when the inserting plate 34 is retarded to its limit position, the stopper slide plate 39 faces with the piece inserting position A.

Although the stopper plate 43 does not have a timing directly relating to the timing of the inserting and stopper slide plates 34 and 39, it moves from the position directly under the position B out of the dropping position B while the inverting table 18 is stopping in the same manner as the inserting and stopper slide plates 34 and 39 and again operates at timing to move to the position directly under the position B while the next piece guide recess 19 moves to the dropping position B.

Conveyor Belt 14a, Inverting Table 18 and Cam 20 Timing Unit

Referring also to FIGS. 4 to 6, the conveyor 14a, inverting table 18 and cam 20 timing unit of the device of the present invention function as a drive unit and accordingly transmit the continuous rotating force of predetermined speed from a drive source of the heat blow molding machine connected with the device of the present invention as received via a drive sprocket 2 secured to a drive shaft 1, through a transmission sprocket 4 secured to the drive shaft 1 to an input sprocket 5 secured to the input shaft 6 of the index unit 7.

A torque limiter 3 is mounted at the drive shaft 1 for inhibiting to apply higher than predetermined torque to the index unit 7 and accordingly the device of the present invention.

The output shaft 8 of the index unit 7 is constructed to rotate intermittently at every 90° of central angle upon one revolution of the input shaft 6 thus to rotate one revolution when the input shaft 6 rotates four revolutions.

The inverting table 18 is secured to the output shaft 8 as was heretofore described, and the belt pulleys 14a, 14 are also engaged to the output shaft 8.

The camshaft 24 securing the cam 20 is directly connected to the input shaft 6 without the index unit 7.

Accordingly, the respective cams rotate one revolution while the inverting table 18 intermittently rotates at every 90° of its central angle. The piece inserting plate 34, stopper slide plate 39 and stopper plate 43 operate as predetermined during the stopping time of the inverting table 18 while the cams rotate one revolution.

The device for supplying the piece to the heat blow molding machine of the present invention is thus constructed and will be described in operation below.

The piece P slidably lowered in upward opening attitude through the supply chute 44 is temporarily stopped at the position of the belt pulleys 14a, 14a, and is interposed between the conveyor belts 14a, 14a synchronously at a timing completely with the rotating operation of the inverting table 18 to be intermittently conveyed one by one every time the inverting table 18 rotates at 90°.

The piece thus conveyed to the belt pulley 17 is conveyed further to the position C simultaneously upon next rotation of the inverting table 18 to be held by the stopper slide plate 39 at the position C.

When the inverting table 18 is stopped, the stopper slide plate 39 is first moved from the inserting position A to release the piece guide recess 19 located at the position A at the position C.

When the stopper slide plate 39 completes its movement from the inserting position A, the inserting plate 34 is advanced to insert the piece located at the position C into the piece guide recess 19 located at the position A and is again returned to the original position.

It is noted that the piece P thus inserted into the piece guide recess 19 is stabilized in its attitude therein by operating vacuum for evacuating the air via the hole 19a in the piece guide recess 19 at a timing synchronously with the inserting operation of the piece P by the inserting plate 34 when the piece P is inserted into the piece guide recess 19 by the inserting plate 34.

When the piece P is thus inserted into the piece guide recess 19 by the inserting plate 34 and the plate 34 is returned to its original position, the stopper slide plate 39 is again returned to the inserting position A. The inverting table 18 is rotated to move the conveyor belts 14a, 14a at the distance corresponding to one piece P by rotating the output shaft 8 at 90° of central angle after the stopper slide plate 39 is completely returned to the inserting position A.

The piece guide recess 19 containing the piece P by the intermittent rotation of the output shaft 18 is rotated to become horizontal, and next piece guide recess 19 is rotated to the inserting position A.

When the output shaft 18 is again rotated at 90° of central angle after the same insertion of the piece P is conducted in the same manner as above at the inserting position A, the piece guide recess 19 becoming horizontal is stopped at the dropping position B in the attitude that the piece contained in upward opening state at the inserting position A is inverted, namely the piece is rotated in inverted attitude at 180° from the inserting position A.

Since the stopper plate 43 is moved from the dropping position B to release the holding force of the piece P contained in the piece guide recess 19 disposed at the dropping position B when the piece guide recess 19 is stopped at the dropping position B, the piece P in the piece guide recess 19 is naturally dropped by its self-weight to be assembled with the mandrel 47 moved to the position directly under the dropping position B.

It is preferable that, when the piece P is dropped from the piece guide recess 19 at the position B, air is vigorously ejected from the hole 19b opened at the bottom of the piece guide recess 19 to ensure the drop of the piece P from the piece guide recess 19.

In the meantime, the mandrel 47 disposed directly under the dropping position B for assembling the piece P dropped from the piece guide recess 19 at the position B is assembled in large number with the turntable of the heat blow molding machine to heat the piece P assembled thus while intermittently moving together with the turntable for the blow molding process. The moving timing of the mandrel 47 is entirely the same as that of the output shaft 8. It is readily obvious that the rotary drive force is transmitted to the device of the present invention from the heat blow molding machine to operate the mandrel 47.

It is readily appreciated that the connection to the holes 19a and/or 19b can be simply performed by utilizing the output shaft 8.

It should be understood from the foregoing description that, since the device of the present invention is thus constructed and operated, it can continuously supply a number of the pieces P in the upward opening attitude adapted for the automatic conveyance, intermittently convey the pieces P continuously supplied thus one by one at predetermined timing while maintaining the attitude, automatically invert them to downward opening attitude, and automatically assemble them with the mandrel at a timing adapted for the molding cycle of the heat blow molding machine.

It should also be appreciated that, since the rotary driving force of the device of the present invention is transmitted from the driving force of the heat blow molding machine, the device of the present invention can simply and exactly synchronize the timing with the heat blow molding machine.

It should also be understood from above that, since the device of the present invention automatically inverts the pieces P of the upward opening attitude to the downward opening attitude and assembles them with the mandrel 47 of the heat blow molding machine, the pieces P can be conveyed in the upward opening attitude (i.e., in the most easily conveyed manner) thereby to convey the pieces P molded by the injection molding machine to the heat blow molding machine in the same array as at the injection molding machine to cause easy management of the molded products in accuracy.

It should also be readily appreciated that, since the device of the present invention can supply the pieces P to the heat blow molding machine at a timing adapted for the molding cycle of the heat blow molding machine, it can effectively operate the heat blow molding machine.

It should also be understood that, since the device of the present invention automatically supplies the pieces P to the heat blow molding machine without any manual power at a speed adapted for the molding cycle of the heat blow molding machine as was described before, it can eliminate difficulties such as decrease of the molding speed of the piece P in a piece supply line to the heat blow molding machine effective in an injection blow molding process.

Although the specific embodiments of the present invention have been described hereinbefore, it should be understood that numerous variations thereof may be employed without departing from the invention, and it is reiterated that the examples given above are simply illustrative of the device for supplying the piece P to the heat blow molding machine.

What is claimed is:

1. A device for supplying an injection-molded, bottomed cylindrical piece in upward opening attitude to a biaxial orientation blow molding machine by inverting the piece 180° into a downward opening attitude and dropping the piece onto a mandrel to assemble the piece with the mandrel, comprising:
two conveyor belts for conveying the piece in said upward opening attitude by interposing the neck of the piece therebetween;
piece conveying means at the conveying end of said conveyor belts;
an inverting table having a radius at least larger than the length of the piece and open radially extending piece guide recesses for containing and holding the piece, said inverting table being disposed in vertical attitude to face said piece conveying means at one surface thereof, said table being intermittently rotatable at every 90° to position one of said guide recesses in receiving relationship with said piece conveying means;
holding means for retaining said piece in said piece guide recesses until said piece arrives at a piece dropping position;
an inserting plate for horizontally moving the piece conveyed by said piece conveying means and inserting the piece into the piece guide recess facing said piece conveying means;
a first cam mechanism for moving said inserting plate back and forth;
a stopper plate for dropping the piece from the piece guide recess disposed at said piece dropping position inverted 180° from the inserting position of the piece to assemble the piece with a mandrel directly thereunder; and
a second cam mechanism for slidably moving said stopper plate.

2. The device according to claim 1, wherein said conveyor belts are engaged respectively with belt pulleys rotatably mounted at side plates disposed in parallel at an interval corresponding substantially to a width of the body of the piece.

3. The device according to claim 1, wherein said piece conveying means is disposed at a conveying out end of one of said conveyor belts, before a conveying out end of the other of said conveyor belts by a distance corresponding substantially to at least the thickness of the piece.

4. The device according to claim 2, wherein said belt pulleys are secured to a shaft of a transmission pulley to rotate integrally with the transmission pulley, and a belt is engaged between the transmission pulley and a first timing pulley secured to a repeating shaft secured to a second timing pulley for transmitting the rotation of a third timing pulley secured to an out put shaft of an index unit.

5. The device according to claim 4, wherein the outer diameters of said first, second and third timing pulleys are determined to move said conveyor belts in a distance corresponding to one piece by one revolution of the output shaft intermittently rotated at 90° of central angle.

6. The device according to claim 1, wherein said inverting table is secured to an output shaft of an index unit in a vertical attitude.

7. The device according to claim 1, wherein one or more suction holes are perforated at a wall of the piece guide recesses.

8. The device according to claim 1, wherein a frame is provided around the peripheral surface of said inverting table to cover the portion from the piece inserting position adjacent to the outer peripheral surface thereof to the dropping position.

9. The device according to claim 1, wherein said inserting plate slidably moves in a horizontal direction perpendicularly crossing the conveying direction, and said inserting and stopper plates are operated at a predetermined timing by cams secured to a camshaft continuously rotating at predetermined constant speed.

10. The device according to claim 1, wherein the inserting cam for operating said inserting plate has a cam surface in flat state on a periphery thereof, and a rockable arm secured rockably via a rocking pin is rotatably secured to the inserting cam at one end thereof and is connected via a connecting pin to a slide at the other end thereof.

11. The device according to claim 1, wherein said piece conveying means has a stopper slide plate disposed for inhibiting the pieces of free state therein from moving toward said inverting table and for slidably moving the piece from the inserting position out of said inserting position when the piece is inserted into the piece guide recess.

12. The device according to claim 11, wherein the mutual timing of said inserting plate, stopper slide plate and stopper plate is so provided that, while the inserting plate is advanced from a retarded limit position and is again returned to the retarded limit position, the stopper slide plate is moved out of the piece inserting position to release the inserting stopping operation of the piece.

13. The device according to claim 1, further comprising a torque limiter mounted at a drive shaft of the biaxial orientation blow molding machine for inhibiting application of higher than a predetermined torque to an index unit.

14. The device according to claim 1, wherein the drive shaft of a heat blow molding machine is transmitted via a drive sprocket secured to the drive shaft through a transmission sprocket secured to the drive shaft to an input sprocket secured to the input shaft of an index unit.

* * * * *